(12) United States Patent
Borkar et al.

(10) Patent No.: US 12,003,656 B2
(45) Date of Patent: Jun. 4, 2024

(54) USING INTRINSIC CHIP BEHAVIORS TO GENERATE PHYSICALLY UNCLONABLE FUNCTIONS (PUFs) FOR SECURITY KEY GENERATION

(71) Applicant: QUALCOMM INCORPORATED, San Diego, CA (US)

(72) Inventors: Shekhar Yeshwant Borkar, Beaverton, OR (US); Justin Joseph Rosen Gagne, San Diego, CA (US); Dallas James Wiener, San Diego, CA (US); Peter Belding, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/666,309

(22) Filed: Feb. 7, 2022

(65) Prior Publication Data
US 2023/0254165 A1 Aug. 10, 2023

(51) Int. Cl.
*H04L 9/32* (2006.01)
*G06F 1/20* (2006.01)
*G06F 9/30* (2018.01)

(52) U.S. Cl.
CPC ............ *H04L 9/3278* (2013.01); *G06F 1/206* (2013.01); *G06F 9/30036* (2013.01)

(58) Field of Classification Search
CPC ..... H04L 9/3278; H04L 9/0866; G06F 1/206; G06F 9/30036; G09C 1/00
See application file for complete search history.

(56) References Cited

U.S. PATENT DOCUMENTS

2019/0044740 A1* 2/2019 Smith ................. H04W 12/009
2021/0194706 A1* 6/2021 Aronson ................... H04L 9/50

FOREIGN PATENT DOCUMENTS

EP 3514960 A1 7/2019

OTHER PUBLICATIONS

International Search Report and Written Opinion—PCT/US2023/060326—ISA/EPO—Apr. 20, 2023.
Yin C-E., et al., "Temperature-aware Cooperative Ring Oscillator PUF", Hardware-oriented Security and Trust, 2009. HOST '09. IEEE International Workshop On, Piscataway, NJ, USA, Jul. 27, 2009, pp. 36-42, XP031520802, DOI: 10.1109/HST.2009.5225055, section III.

* cited by examiner

*Primary Examiner* — Daniel D Chang
(74) *Attorney, Agent, or Firm* — Smith Tempel Blaha LLC/Qualcomm

(57) ABSTRACT

Systems, methods and computer-readable mediums may use intrinsic behavior of an integrated circuit (IC) chip to generate Physically Unclonable Function (PUF) vector bits. A processor of the system may be configured to receive a plurality of temperature values corresponding to a plurality of respective temperature measurement values obtained by a plurality of respective temperature sensors disposed on the IC chip. The processor may be further configured to process the temperature measurement values to generate PUF vector bits that can be used to generate a security key.

27 Claims, 9 Drawing Sheets

US 12,003,656 B2

USING INTRINSIC CHIP BEHAVIORS TO GENERATE PHYSICALLY UNCLONABLE FUNCTIONS (PUFs) FOR SECURITY KEY GENERATION

DESCRIPTION OF THE RELATED ART

Physically Unclonable Functions (PUFs) are used in a variety of security sensitive integrated circuit (IC) chip applications due to their inherent nature of generating unique cryptographic values that are difficult for an adversary to externally observe or measure. Security system-on-a-chip (SoC) ICs frequently use PUFs for key generation (root keys and/or secondary keys) and in challenge/response authentication routines.

In general, there are two types of PUFs: (1) extrinsic, where special PUF structures are designed in the SoC to provide the PUF functionality; and (2) intrinsic, where a PUF is derived from the existing structures and functions already implemented in the SoC. Optical and Magnetic PUFs are examples of extrinsic PUFs. Another example is a current mirror and operational amplifier-based structure that uses the difference between the threshold voltages of two transistors to define a unique PUF bit. This difference does not change and is unique to each instance of this amplifier on an SoC, and thus is unique to the die.

The advantage of an extrinsic PUF is that it is much more robust than existing intrinsic PUFs. However, there are several drawbacks: (1) the extrinsic structures occupy space on the die, thereby adding cost; (2) amplifiers consume power; and (3) the extrinsic structures must be planned and implemented as an integral part of the SoC.

There are several intrinsic PUFs that have been proposed. One of the popular proposed PUFs is based on the preferred settling pattern of a static random access memory (SRAM) upon power-up. When the SRAM is powered up, the individual bits may have a preference (0 or 1) depending on the hardware characteristics, such as the strengths of the individual transistors, and therefore can be used as a PUF. Another proposed PUF utilizes dynamic RAM (DRAM) where the memory controller is programmed to reduce read time of the DRAM (row-select to column select) to introduce errors. These errors, which are hopefully repeatable, indirectly constitute the PUF function. The biggest criticism of these approaches is the impact of thermal noise, which is about 25 millivolts (mV) at room temperature, and therefore large enough to overcome hardware mismatch, causing metastability—forcing randomness, and not determinism as required in a PUF.

Unfortunately, PUFs are not yet widely used in commercial SoC ICs today. PUFs offer improved security properties compared to key storage and protection commonly used in standard commercial SoCs today. Security applications running on today's available commercial SoC ICs could benefit from the security properties of a PUF.

SUMMARY OF THE DISCLOSURE

Systems, methods, computer-readable media, and other examples are disclosed herein for using intrinsic chip behaviors to generate PUFs that can be used to generate security keys.

An exemplary system for generating PUF vector bits may include a plurality of temperature sensors (first through $n^{th}$ temperature sensors, $S_1$ through $S_n$, where n is a positive integer that is greater than or equal to two) and a processor disposed on an IC chip. The processor may be configured to receive a plurality of temperature measurement values from the temperature sensors. The processor may be further configured to process the received temperature measurement values to generate PUF vector bits.

An exemplary embodiment of the method for generating PUF vector bits may include using first through $n^{th}$ temperature sensors, $S_1$ through $S_n$, respectively, disposed on an IC chip to obtain n temperature measurement values, where n is a positive integer that is greater than or equal to two. The method may further include receiving the n temperature sensor values in a processor disposed on the IC chip and processing the received n temperature sensor values to generate PUF vector bits.

An exemplary embodiment of the non-transitory computer-readable medium includes computer instructions for execution by a processor to generate PUF vector bits. The computer instructions may include a first set of computer instructions for receiving n temperature measurement values obtained by first through $n^{th}$ temperature sensors, $S_1$ through $S_n$, respectively, disposed on an IC chip, where n is a positive integer that is greater than or equal to two. The computer-readable medium may further include a second set of instructions for processing the n received temperature measurement values to generate PUF vector bits.

Another exemplary embodiment of the system for generating PUF vector bits may include means disposed on the IC chip for receiving n temperature measurement values obtained by first through $n^{th}$ temperature sensors, $S_1$ through $S_n$, respectively, disposed on the IC chip, where n is a positive integer that is greater than or equal to two. The system may further include means disposed on the IC chip for processing the n received temperature measurement values to generate PUF vector bits.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
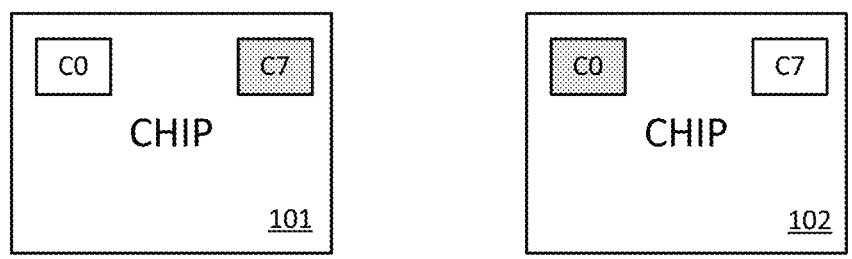
FIG. 1 is a block diagram of first and second SoCs with shading that illustrates effects of systematic variations.

The present disclosure discloses systems, methods and computer-readable mediums for using intrinsic chip behaviors to generate PUFs that can be used to generate security keys. The systems, methods and computer-readable mediums disclosed herein are well suited for implementation in an SoC for root or secondary key generation, although they can be implemented in any IC chip for root or secondary key generation or other purposes.

For ease of discussion and for purposes of demonstrating inventive principles and concepts of the present disclosure, the inventive principles and concepts will be discussed primarily with reference to SoCs, but it should be noted that the inventive principles and concepts apply to any IC chip, as will be understood by one of skill in the art having the benefit of reviewing the present disclosure. Therefore, for any discussion in the present disclosure of the inventive principles and concepts applied to SoCs, it should be assumed that the same inventive principles and concepts apply equally to other types of IC chips.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or more memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

A computing device may include multiple subsystems, cores or other components. Such a computing device may be, for example, a portable computing device ("PCD"), such as a laptop or palmtop computer, a cellular telephone or smartphone, portable digital assistant, portable game console, etc.

The multiple subsystems, cores or other components of a computing device may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity.

A computing device may include resources that are shared among SoC processors or other processing subsystems. For example, processors may share access to a main or system memory of the computing device. A processor may also be associated with a local cache memory.

The inventive principles and concepts of the present disclosure relate to using existing hardware features, i.e., intrinsic, to extract PUFs, based on observing the following characteristics of design and fabrication of IC chips:
1. Systematic variations are inherent in Very Large Scale Integration (VLSI) fabrication.
2. Systematic variations have an impact on active and quiescent transistor subthreshold leakage current.
3. Variations in leakage power translates to local, regional, temperature variations.
4. Carefully measuring local temperatures impacted by leakage, using built-in sensors, can translate to a unique PUF signature for the SoC.

Variations are introduced during SoC fabrication by irregularities such as unevenness of photo-resist thickness, lens aberrations, and many more. For example, patterning with sub-wavelength and computational lithography introduces roughness in the edges. These variations are within die (intra SoC) or from die-to-die (inter SoC). These variations impact one of the most critical parameters of a transistor, namely, the subthreshold leakage current. The subthreshold leakage current is the transistor current when it is turned off (leakage). Variation in the leakage current results in variation in leakage power, resulting in variation in temperature. Methods of the present disclosure detects this variation in temperature to create the PUF. Since each SoC has a unique variation signature, the resultant PUF is also unique.

FIG. 1 is a block diagram of first and second SoCs 101 and 102, respectively, with shading that illustrates effects of systematic variations. Systematic variations repeat with a pattern as shown in FIG. 1, where darker shading represents higher leakage. The first SoC 101 has CPU core C0 [no shading] that is in a leakage region exhibiting lower leakage than that experienced by CPU core C7 [shaded] of SoC 101, which is in the higher leakage region, exemplifying intra-die variation. The second SoC 102 shows exactly the opposite, i.e., C0 [shaded] of SoC 102 has higher leakage than C7 [no shading] of SoC 102, thereby demonstrating die-to-die variations with leakage. Therefore, the effect of systematic variations on leakage lends itself to creating a unique PUF for each SoC 101, 102.

The leakage current is a strong function of temperature and noise as shown below. Hence, adding activity to the circuit block creates more leakage in the block, with even higher temperatures for detection. If the SoC is large and fabricated in a high-performance process (and thus higher leakage), such as a server class chip, then the difference in quiescent leakage may not be large enough to obtain useful temperature measurements. However, this can be accentuated by inducing active leakage, that is, by running a workload on the circuit to create more leakage to create appreciable temperature variations. On the other hand, for lower power SoCs used in mobile and IoT applications, the quiescent leakage is sufficient. Both approaches are described below in more detail with reference to FIGS. 2, 3 and 4.

Figures 2, 3:
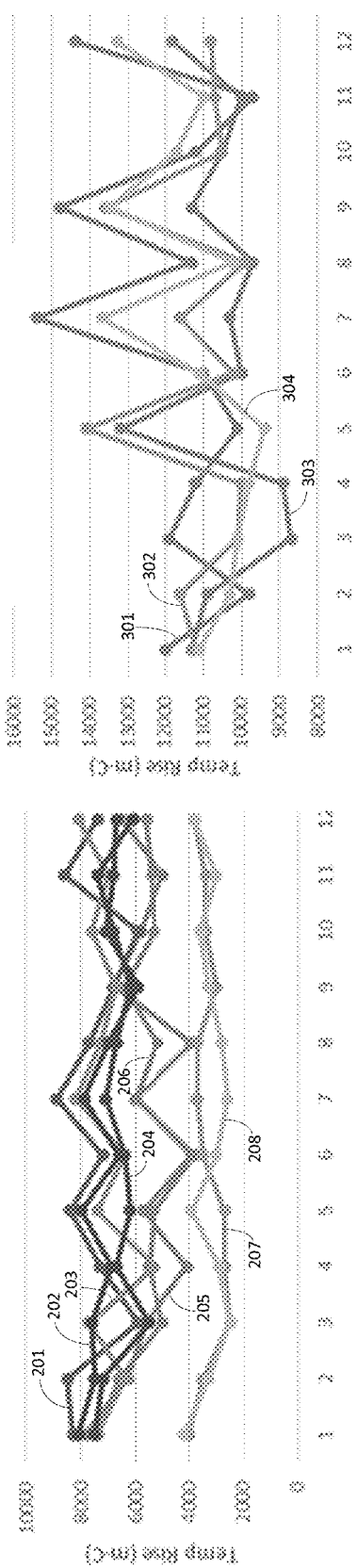
FIG. 2 is a graph of temperature increase (vertical axis) for each of twelve cores (horizontal axis) in a server chip when activated by a high-activity workload, repeated for eight server chips.
FIG. 3 is a graph of temperature increase (vertical axis) for each of twelve cores (horizontal axis) in a server chip when activated by a high-activity workload, repeated for four server chips.

First, the active leakage approach used for the server class chips will be described with reference to FIGS. 2 and 3 for different types of server SoCs. FIGS. 2 and 3 are graphs of temperature increase (vertical axis) for twelve cores (horizontal axis) in a server chip when activated by a high-activity workload, repeated for twelve server chips fabricated using 14 nanometer (nm) process technology. Plots 201-208 of FIG. 2 represent the temperature increase measurements of eight different server chips of one type and Plots 301-304 of FIG. 3 represent the temperature increase measurements of four different server chips of another type. It can be seen from the plots that each server chip has a different temperature floor, that each core on a chip has a different temperature, and that there is a temperature difference between cores on the same chip. As will be discussed below, this property can be used to create a unique signature for the chip to establish a PUF. This process is repeatable and consistent, as will be described below in more detail with reference to FIG. 5.

Figure 4:
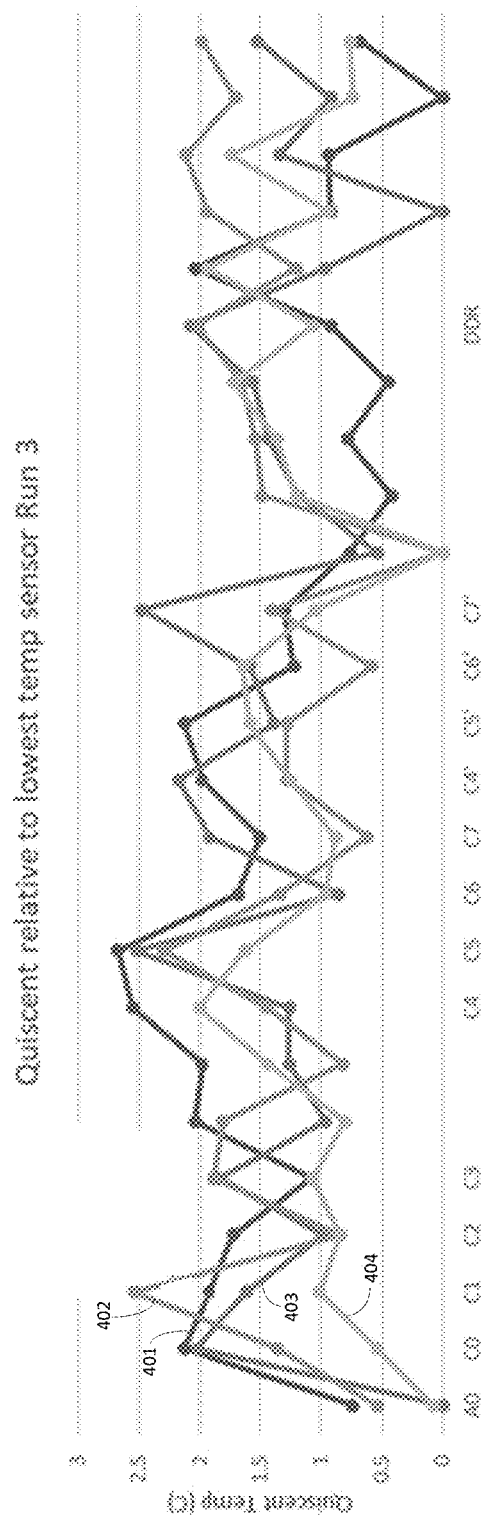
FIG. 4 is a graph of temperature increase (vertical axis) measured by twenty-five temperature sensors (horizontal axis) in a smaller SoC in quiescent state, repeated for four SoCs of a particular type relative to the lowest temperature sensed by the group of sensors.

FIG. 4 shows quiescent leakage measurements obtained for smaller SoCs of a type used today in mobile devices, FIG. 4 is a graph of temperature increase (vertical axis) measured by twenty-five temperature sensors (horizontal axis) in a smaller SoC in quiescent state, repeated for four SoCs of a particular type (plots 401-404). Again, it can be seen that each temperature signature for each of these smaller SoCs is unique.

Figure 5:
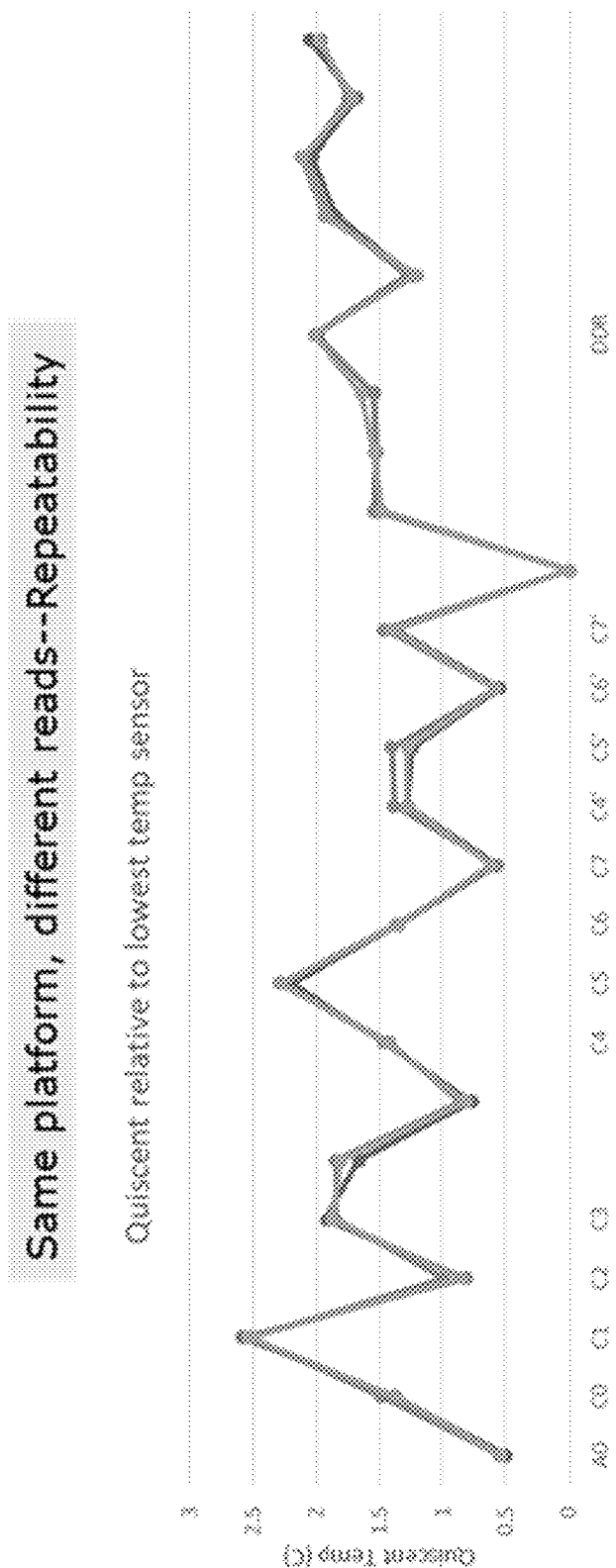
FIG. 5 is a graph of temperature increase (vertical axis) measured by twenty-five temperature sensors (horizontal axis) in one of the SoCs in quiescent state that was used to obtain one of the plots shown in FIG. 4, repeated multiple runs for that particular SoC.

FIG. 5 demonstrates the repeatability of the method of the present disclosure. FIG. 5 is a graph of temperature increase (vertical axis) measured by twenty-five temperature sensors (horizontal axis) in a smaller SoC in quiescent state, repeated for multiple runs for that particular SoC. It can be seen from FIG. 5 that the unique temperature increase signature is substantially the same for each run, thus demonstrating that the reliability of the method.

Several algorithms can be used to translate this unique temperature signature of an SoC into the PUF vector. The inventive principles and concepts are not limited to using any particular algorithm for this purpose, and therefore any suitable algorithm can be used for this purpose. An example of one such algorithm compares temperature differences of two or more sensor outputs and uses the differences to generate a PUF signature. The number of sensor output comparisons that are made can be based on the following equation: $^nC_m = n!/(m! \times (n-m)!) = t$ comparisons, where n is the total number of temperature sensor outputs, m is the number of sensor outputs that are compared to one another at a time and t is the total number of comparisons that are performed. For each comparison, the result is translated or converted into a particular number of PUF vector bits.

For example, if pairs of sensor outputs are compared to one another at a time, and twenty-five sensors are used to generate the PUF vector, this results in $^{25}C_2 = 25!/(2! \times (25-2)!) = 300$ comparisons, with the result of each comparison being converted or translated into a number of bits of the PUF vector. In this example, when the corresponding difference values resulting from the comparisons are converted into PUF bits and filtering and error correction are performed, this yields a PUF vector that is approximately 350 bits in length. The goodness of the PUF vectors obtained by this method was established in terms of the distribution of 0's and 1's, the standard deviation for intra-PUF bits, and hamming distance for inter-PUF bits among different platforms.

It should be noted that it is not necessary for pairs of the sensor outputs to be compared. In other words, m can be any integer that is greater than or equal to two and less than or equal to n. Any desired comparison method can be performed to obtain the difference value(s) that are translated into the PUF vector bits, provided that the same comparison method is used consistently to derive the PUF vector bits. For example, considering only the outputs of three temperature sensors, namely, sensor1, sensor2 and sensor3, the comparison process might be summarized as: if (sensor1>sensor2) and (sensor2<sensor3), then use (sensor1−sensor2)+(sensor3−sensor2) to generate bits, else if . . . . Therefore, the sensor outputs can be processed in any suitable manner to obtain the PUF vector bits, provided that they are processed in the same way each time that the PUF vector is generated.

Figure 6:
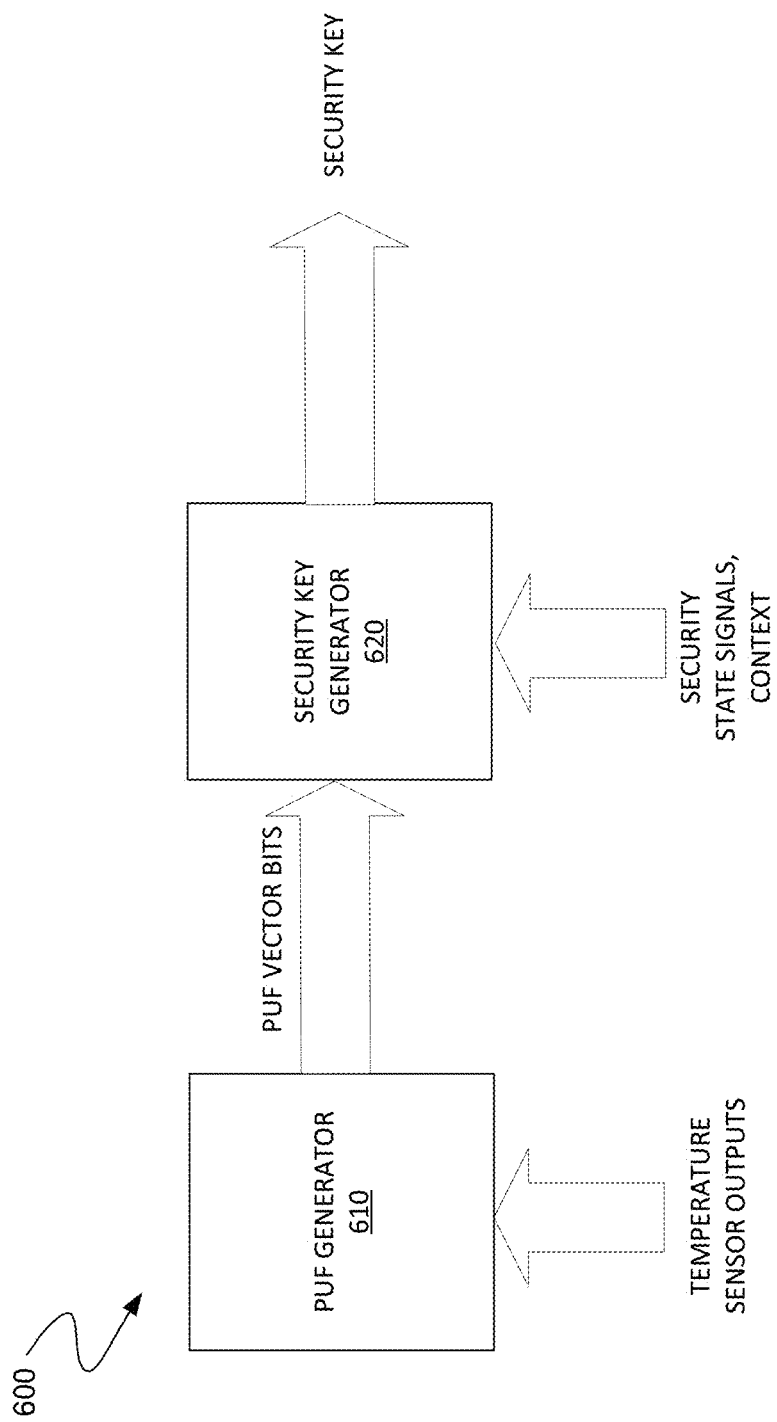
FIG. 6 is a block diagram of the system in accordance with an exemplary embodiment for using intrinsic chip behavior described above with reference to FIGS. 2-5 to generate PUF vector bits, which are then used to generate a security key.
Figure 7:
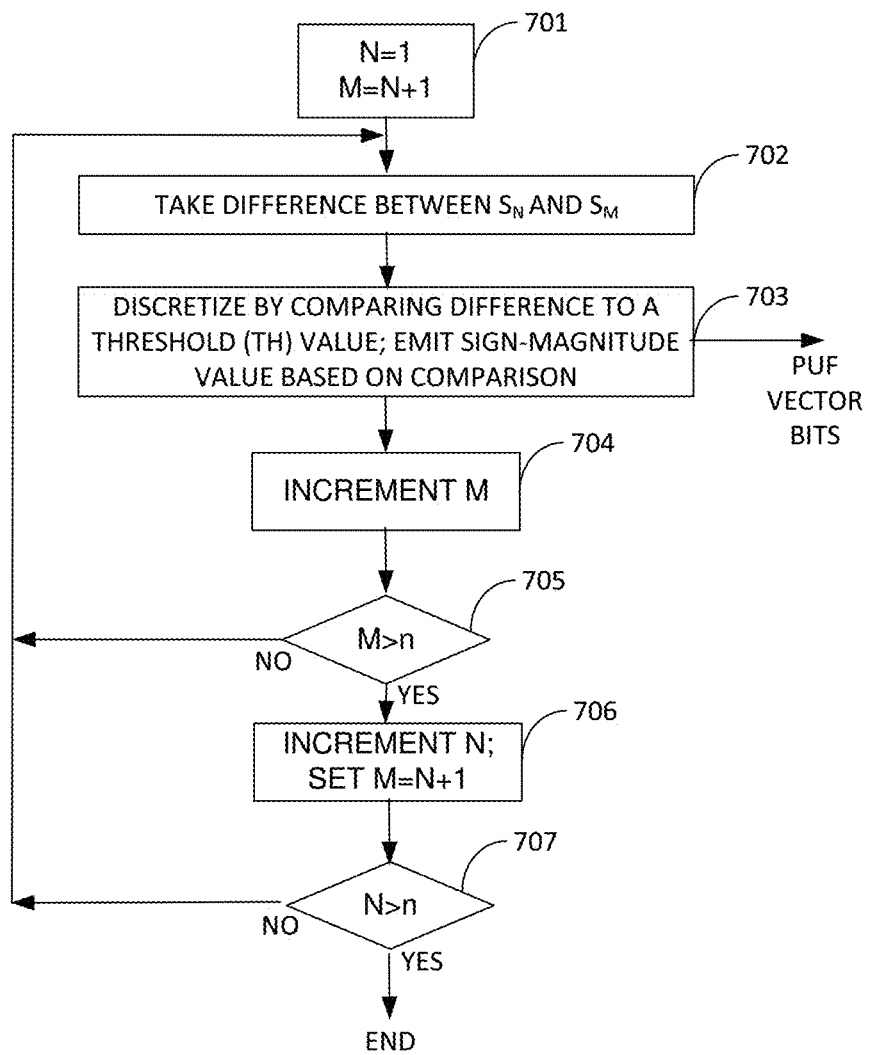
FIG. 7 is a flow diagram of a PUF bit vector generator algorithm in accordance with an exemplary embodiment that compares the temperature sensor outputs and translates the comparison results into the PUF vector bits.

FIG. 6 is a block diagram of the system 600 in accordance with an exemplary embodiment for using intrinsic chip behavior described above with reference to FIGS. 2-5 to generate PUF vector bits, which are then used to generate a security key. FIG. 7 is a flow diagram of an example of the algorithm performed by the PUF generator 610 of the system 600 to generate the PUF vector bits in accordance with an exemplary embodiment in which the comparisons of the sensor outputs are performed according to the equation $^nC_m=n!/(m!\times(n-m)!)=t$ comparisons, where n is the total number of temperature sensor outputs and m=2, and the result of each comparison is translated into PUF bits.

With reference to FIG. 6, a PUF generator 610 of the system 600 receives the outputs of n on-board temperature sensors of the chip, where n is a positive integer equal to the number of sensors that will be used in the method. The PUF generator 610 performs the algorithm discussed above to compare the temperature sensor outputs and translate the comparison results into the PUF vector bits, as will be described below with reference to FIG. 7. The PUF vector bits are then input into a security key generator 620, which can be a known security key generator that receives security state signals, context and the PUF vector bits as input and processes them in accordance with a preselected key derivation function to produce a security key. Security key generators are known that can be used for this purpose, and therefore a detailed discussion of the security key generator is not provided herein in the interest of brevity.

With reference to the example represented by the flow diagram shown in FIG. 7 in which pairs of sensor outputs are compared and the difference is discretized into one or more PUB vector bits, M and N are used to represent the sensor values to be compared, $S_N$ and $S_M$. At the start of the algorithm, N is set equal to 1 and M is set equal to N+1 at block 701 to prepare to compare the first and second sensor values $S_1$ and $S_2$, respectively, to one another. At block 702, the comparison is performed to obtain a difference value. At block 703, the difference value is discretized by comparing it to a threshold (TH) value and emitting one or more bit values based on the comparison. The bit values that are emitted can be sign-magnitude integers or unsigned integers, but preferably are sign-magnitude integers to obtain a PUF bit vector having a larger number of bits for better quality. In accordance with an exemplary embodiment, the TH value is equal to the precision of the sensor measurement. For example, if the measurement precision of the sensors is 0.5 degrees, then the TH value is set equal to 0.5. If the difference between the temperature sensor outputs is typically on the order of about 2.0 degrees, this yields 2/0.5=4, which is two unsigned bits. For example, the unsigned bits may be converted into a sign-magnitude integer as follows: if $S_N>S_M$, then emit 010; if $S_N<S_M$, emit 110; if the difference value is less than or equal to TH and greater than or equal to 0, emit 0. For example, for $S_1$=22.3 and $S_2$=22.1, the difference value is 0.2, but is emitted as a 0 in the example where the precision is 0.5.

After the bit(s) are emitted at block 703, M is incremented by one at block 704. A determination is then made at block 705 as to whether the current value of M is now greater than the total number of sensors, n. The number of sensors that is used, n, depends on the number of bits that is desired for the PUF bit vector, and can vary depending on the value of m in the equation $^nC_m=n!/(m!\times(n-m)!)=t$ comparisons. For example, if m=2, then n is typically equal to or greater than 14, whereas if m=3, then n is typically equal to or greater than 9. The inventive principles and concepts are not limited with respect to the number of sensors used or with respect to the number of bits that make up the PUF bit vector.

If it is determined at block 705 that M is not greater than n, the process returns to block 702 and the processes represented by blocks 702-704 are performed again. For example, on the second time through this loop, the difference between the values of $S_1$ and $S_3$ is taken at block 702 and discretized at block 703, and so on until the values of $S_1$ and $S_n$ have been compared and the corresponding difference value has been discretized. For example, where n=25, the process represented by blocks 702-704 is repeated until the values of sensors $S_1$ and $S_{25}$ have been compared and the difference value has been discretized.

Once a determination has been made at block 705 that M>n, the value of N is incremented by one and the value of M is set equal to N+1. The process then returns to block 702. For example, once the output value of sensor $S_1$ has been compared to the output values of sensors $S_2$-$S_{25}$ at block 702 and the difference values have been discretized at block 703, this loop is reiterated: the output value of sensor $S_2$ is compared to the output values of sensors $S_3$-$S_{25}$ at block 702 and the difference values are discretized at block 703. Each time the steps represented by block 706 are performed, a determination is made at block 707 as to whether N>n, i.e., whether the output value of sensor $S_{n-1}$ was used at block 702 and N has now been incremented at block 706 to be greater than n. If so, the process ends; otherwise, the process returns to the loop that starts with block 702 and reiterates.

The PUF vector bits that are emitted at block 703 can be assembled in the order in which they are emitted to generate the PUF bit vector, or in any desired order provided they are assembled in the same way each time the PUF bit vector is generated by the PUF generator 610. The example of the algorithm represented by the flow diagram of FIG. 7 is based on the above equation $^nC_m=n!/(m!\times(n-m)!)=t$ comparisons, for case where m=2. As indicated above, the inventive principles and concepts are not limited to using this process to generate the PUF bits. Any suitable process can be used to process the temperature values that are output by the temperature sensors to generate the PUF bit vector. Although relative values are used in the examples given above in which sensor output values are compared to the other sensor output values, other approaches are possible, such as, for example, comparing each sensor output value to a preselected TH value. The TH value may be adjustable based on chip conditions since ambient temperature of the chip can be different at different times, leading to differences in the output values of the temperature sensors, and consequently, in the PUF bit vector. Because ambient temperature of the chip can be different at different times of operation, using difference values is more reliable than using absolute temperature output values. Temperature difference values, too, can be different at different times of operation, but can be corrected.

Figure 8:
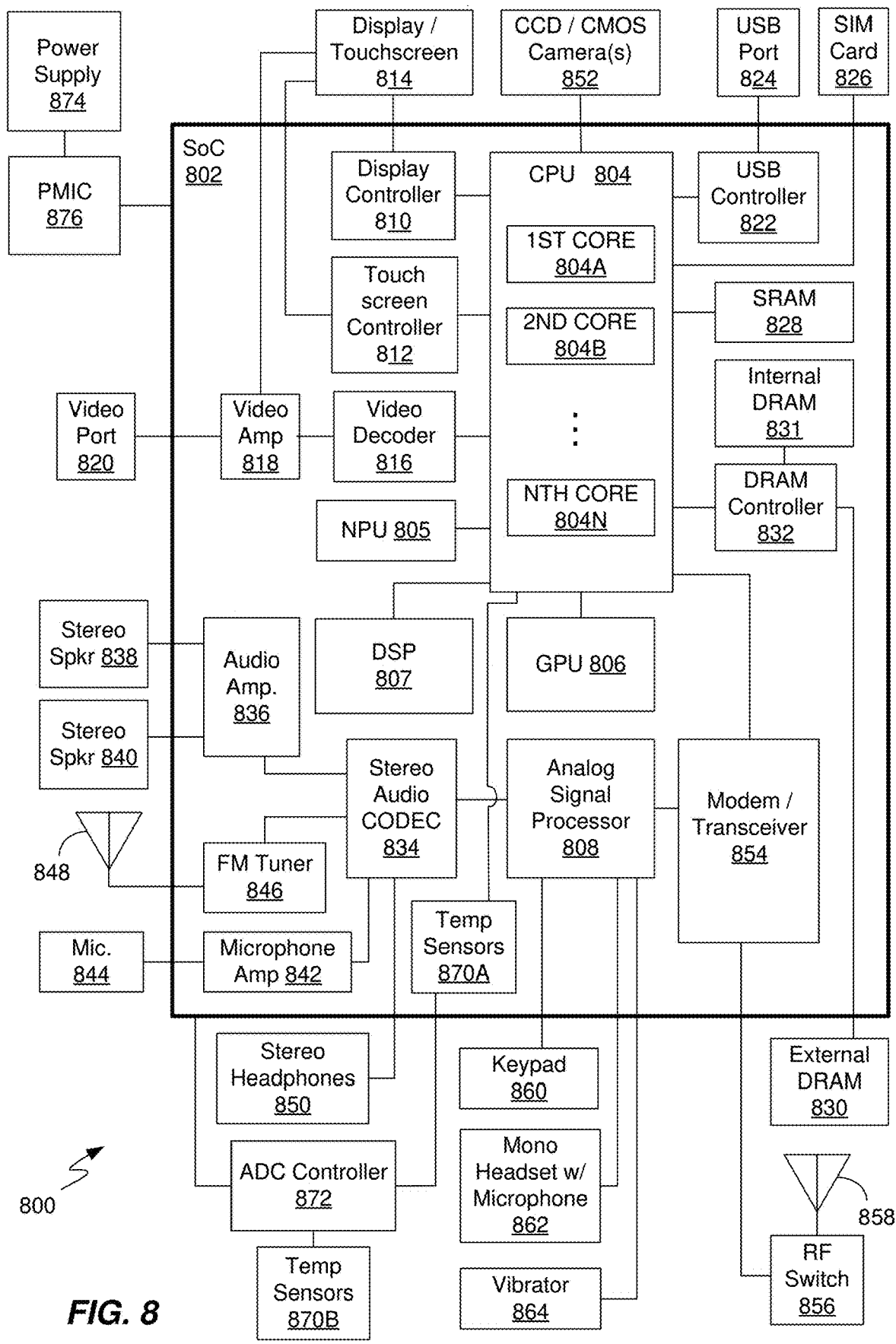
FIG. 8 illustrates an example of a portable computing device (PCD), such as a mobile phone or smartphone, in which exemplary embodiments of systems, methods, computer-readable media, and other examples of providing cache coherency may be provided.

The method of the present disclosure can be implemented in a PCD, although the inventive principles and concepts are not limited with respect to the type of device in which the method is implemented. FIG. 8 illustrates an example of a PCD 800, such as a mobile phone or smartphone, in which exemplary embodiments of systems, methods, computer-readable media, and other examples of providing cache coherency may be provided. For purposes of clarity, some interconnects, signals, etc., are not shown in FIG. 8. Although the PCD 800 is shown as an example, other embodiments of systems, methods, computer-readable media, and other examples of using intrinsic chip behavior to generate PUF vector bits may be provided in other types of computing devices or systems.

The PCD 800 may include an SoC 802. The SoC 802 may include a CPU 804, an NPU 805, a GPU 806, a DSP 807, an analog signal processor 808, a modem/modem subsystem 854, or other processors. The CPU 804 may include one or more CPU cores, such as a first CPU core 804A, a second CPU core 804B, etc., through an Nth CPU core 804N, where N is a positive integer that is greater than or equal to one.

The cores 804A-804N may be configured to perform the operations described above with reference to FIGS. 6 and 7, in addition to other operations that hey normally perform. Alternatively, or in addition, any of the processors, such as the NPU 805, GPU 806, DSP 807, etc., may perform some or all of those operations.

A display controller 810 and a touch-screen controller 812 may be coupled to the CPU 804. A touchscreen display 814 external to the SoC 802 may be coupled to the display controller 810 and the touch-screen controller 812. The PCD 800 may further include a video decoder 816 coupled to the CPU 804. A video amplifier 818 may be coupled to the video decoder 816 and the touchscreen display 814. A video port 820 may be coupled to the video amplifier 818. A universal serial bus ("USB") controller 822 may also be coupled to CPU 804, and a USB port 824 may be coupled to the USB controller 822. A subscriber identity module ("SIM") card 826 may also be coupled to the CPU 804.

One or more memories may be coupled to the CPU 804. The one or more memories may include both volatile and non-volatile memories. Examples of volatile memories include static random access memory ("SRAM") 828 and dynamic random access memory ("DRAM") 830 and 831. Such memories may be external to the SoC 802, such as the DRAM 830, or internal to the SoC 802, such as the DRAM 831. A DRAM controller 832 coupled to the CPU 804 may control the writing of data to, and reading of data from, the DRAMs 830 and 831. The DRAMs 830 and 831 may be examples of any of the system memories described above. The SRAM 828 may be an example of the above-described local cache memory or a system-level cache memory.

A stereo audio CODEC 834 may be coupled to the analog signal processor 808. Further, an audio amplifier 836 may be coupled to the stereo audio CODEC 834. First and second stereo speakers 838 and 840, respectively, may be coupled to the audio amplifier 836. In addition, a microphone amplifier 842 may be coupled to the stereo audio CODEC 834, and a microphone 844 may be coupled to the microphone amplifier 842. A frequency modulation ("FM") radio tuner 846 may be coupled to the stereo audio CODEC 834. An FM antenna 848 may be coupled to the FM radio tuner 846. Further, stereo headphones 850 may be coupled to the stereo audio CODEC 834. Other devices that may be coupled to the CPU 804 include one or more digital (e.g., CCD or CMOS) cameras 852.

A modem or RF transceiver 854 may be coupled to the analog signal processor 808 and the CPU 804. An RF switch 856 may be coupled to the RF transceiver 854 and an RF antenna 858. In addition, a keypad 860, a mono headset with a microphone 862, and a vibrator device 864 may be coupled to the analog signal processor 808.

The SoC 802 has one or more internal or on-chip thermal sensors 870A and may be coupled to one or more external or off-chip thermal sensors 870B. An analog-to-digital converter controller 872 converts voltage drops produced by the thermal sensors 870A and 870B to digital signals. A power supply 874 and a PMIC 876 may supply power to the SoC 802.

Firmware or software may be stored in any of the above-described memories, such as DRAM 830 or 831, SRAM 828, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

The PUF generator and the security key generator 620 can be implemented in any processor of the SoC 802 such as, for example, in CPU 804, in NPU 805, and/or in DSP 807. The algorithm can be implemented in software and/or in firmware that is executed by one or more of these processors.

Figure 9:
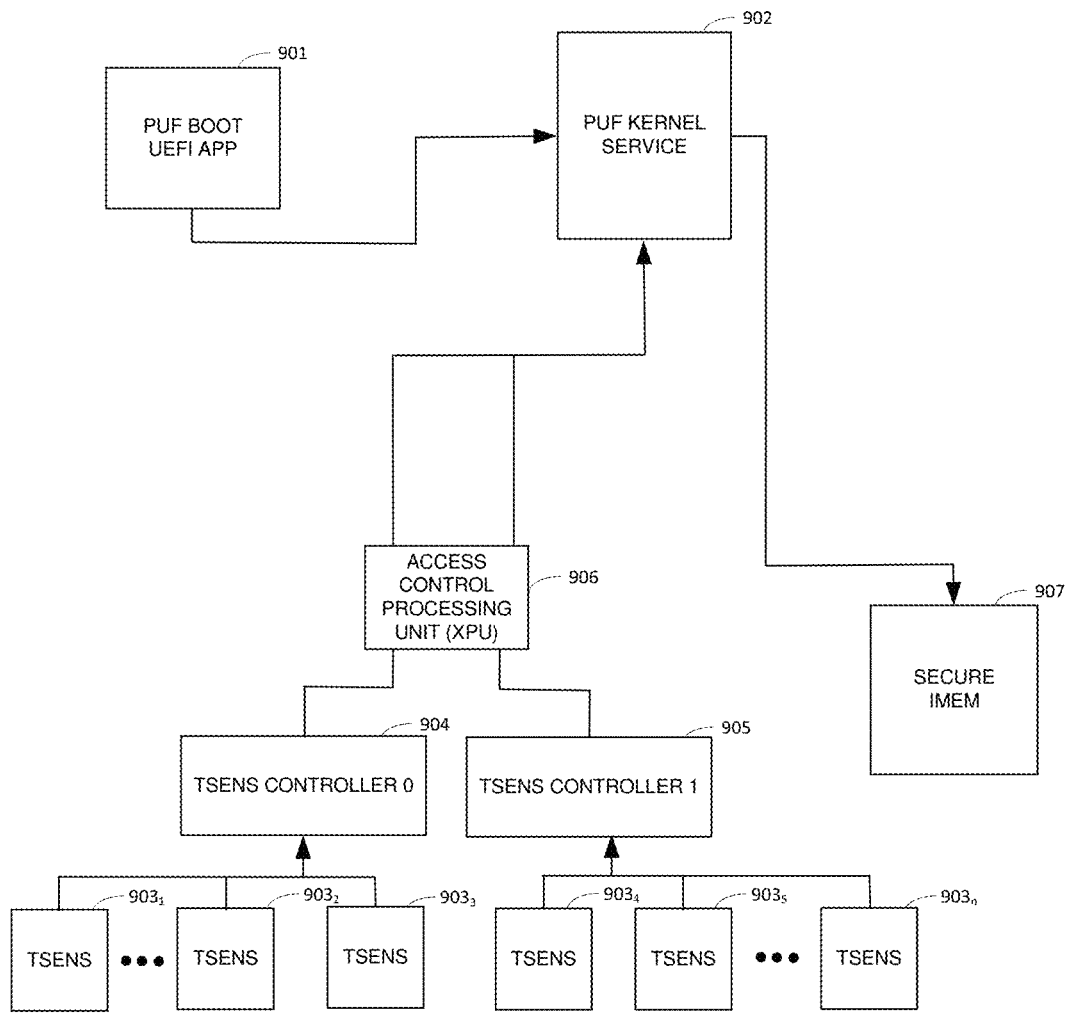
FIG. 9 is a block diagram of one possible implementation scenario for the system shown in FIG. 6 implemented in the SoC shown in FIG. 8 in accordance with an exemplary embodiment in which the algorithm is performed prior to booting the operating system (OS) of the SoC.

FIG. 9 is a block diagram of one possible implementation scenario for the system 600 shown in FIG. 6 implemented in the SoC 802 shown in FIG. 8 in accordance with an exemplary embodiment in which the algorithm for generating the PUF bit vector is performed prior to booting the OS of the SoC 802. In accordance with this exemplary embodiment, the SoC 802 comprises a standardized Unified Extensible Firmware Interface (UEFI), which is a recent version of BIOS that has been modified in accordance with the inventive principles and concepts described herein to perform the PUF bit vector generation functions described above. In accordance with this exemplary embodiment, prior to booting the OS, a PUF UEFI software application 901 executed by the CPU 804 of the SoC 802 shown in FIG. 8 invokes a PUF kernel service 902 that reads temperature sensor (TSENS) status registers $903_1$-$903_n$, which hold the temperature values output from the aforementioned n temperature sensors. Thus, in accordance with this exemplary embodiment, the measurements occur in a stable, pre-boot environment.

The temperature sensor status registers $903_1$-$903_n$ could reside in, for example, block 870A of the SoC 802 shown in FIG. 8. First and second TSENS controllers 904 and 905, respectively, receive instructions from the PUF kernel service 902 to read the TSENS status registers $903_1$-$903_n$ and cause the temperature sensor values stored in the registers to be retrieved and forwarded to the PUF kernel service 902. An access control processing unit (XPU) 906 can be employed to restrict read access to a secure domain.

In accordance with this exemplary embodiment, a PUF software application of the PUF kernel service 902 performs the operations of the PUF generator 610 and security key generator 620 (FIG. 6) discussed above to generate the PUF vector bits and translate them into a security key, which it then causes to be stored in a secure internal memory (IMEM) 907 that preferably is only usable by trusted software during boot. The IMEM 907 can be, for example, part of SRAM 828 or part of the internal DRAM 831 of the SoC 802 shown in FIG. 8. The PUF kernel service 902 can be implemented in the CPU 804 of the SoC 802 shown in FIG. 8. The controllers 904 and 905 and the XPU 906 can be implemented in, for example, block 870A and/or in the CPU 804 of the SoC 802 shown in FIG. 8.

Figure 10:
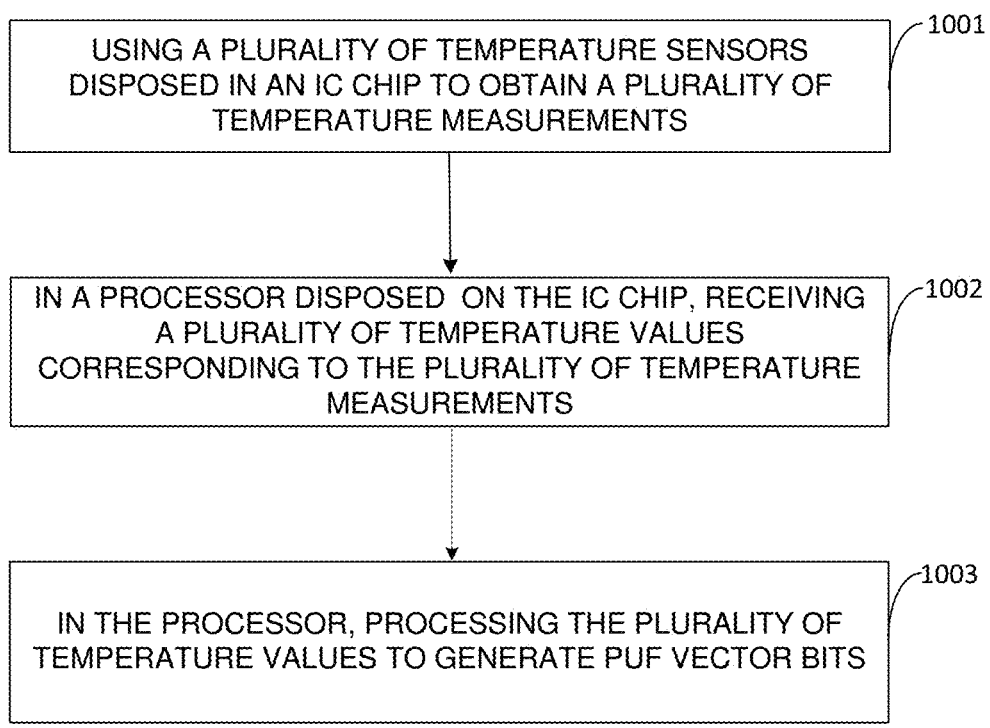
FIG. 10 is a flow diagram that represents the method for using intrinsic behavior of an IC chip to generate PUF vector bits in accordance with an exemplary embodiment.

FIG. 10 is a flow diagram that represents the method for using intrinsic behavior of an IC chip to generate PUF vector bits in accordance with an exemplary embodiment. At the step represented by block 1001, a plurality of temperature sensors disposed in the IC chip are used obtain a plurality of respective temperature measurements. At the step represented by block 1002, in a processor performing a PUF generator algorithm, a plurality of temperature values corresponding to the plurality of respective temperature measurements are received. At the step represented by block 1003, the processor performing the PUF generator algorithm processes the plurality of temperature values to generate PUF vector bits that can be used to generate a security key.

Implementation examples are described in the following numbered clauses:

1. A system for generating Physically Unclonable Function (PUF) vector bits, the system comprising:
    a plurality of temperature sensors (first through $n^{th}$ temperature sensors, $S_1$ through $S_n$, where n is a positive integer that is greater than or equal to two); and
    a processor disposed on an integrated circuit (IC) chip, the processor being configured to receive a plurality of temperature measurement values from the plurality of temperature sensors, and wherein the processor is further configured to process the received temperature measurement values to generate PUF vector bits.

2. The system of clause 1, wherein the plurality of temperature measurement values are processed by:
    comparing a plurality of the received temperature measurements values to one another to obtain a plurality of temperature difference values; and
    translating each temperature difference value into one or more PUF vector bits.

3. The system of clause 2, wherein said comparing is performed by comparing at least a first temperature measurement value obtained by the first temperature sensor, $S_1$, to the temperature measurement values obtained by second through $n^{th}$ temperature sensors, $S_2$-$S_n$, respectively, to obtain n temperature measurement values, where n is a positive integer that is equal to a total number of temperature sensors comprising said plurality of temperature sensors.

4. The system of any of clauses 2-3, wherein said comparing is performed by comparing all of the temperature measurement values to one another in pairs to obtain a temperature difference value for each pair of compared temperature measurement values.

5. The system of any of clauses 2-4, wherein said comparing is performed by:
    (a) setting a variable N=1 and a variable M=N+1;
    (b) taking a difference between two of the temperature sensors, $S_N$ and $S_M$, to obtain a temperature difference value;
    (c) discretizing the temperature difference value obtained at step (b) to produce one or more PUF vector bits;
    (d) incrementing M by one;
    (e) determining whether or not M is greater than n, where n is a positive integer that is equal to a total number of temperature sensors comprising said plurality of temperature sensors, wherein if it is determined that M is not greater than n, reiterating steps (b) through (e), wherein if it is determined that M is greater than n, incrementing N by one and setting M equal to N+1; and
    (f) determining whether or not N is greater than n, wherein if it is determined that N is not greater than n, reiterating steps (a) through (f) until it is determined at step (f) that N is greater than n.

6. The system of any of clauses 1-5, wherein the processor is further configured to receive the PUF vector bits, security state signals and context as inputs, the processor being further configured to process the PUF vector bits, the security state signals and the context to generate a security key, the processor being further configured to store the security key in the memory device.

7. The system of any of clauses 1-6, wherein the system comprises a portable computing device (PCD) in which the IC chip is employed, and wherein the IC chip is a system-on-a-chip (SoC) IC chip.

8. The system of any of clauses 1-7, wherein the PCD comprises a mobile phone.

9. The system of any of clauses 1-8, wherein said plurality of temperature measurement values are received from the plurality of temperature sensors and processed by the processor when the IC chip is in a quiescent state.

10. The system of any of clauses 1-8, wherein said plurality of temperature measurement values are received from the plurality of temperature sensors and processed by the processor when the IC chip is in an active load state.

11. A method for generating Physically Unclonable Function (PUF) vector bits, the method comprising:
    using first through $n^{th}$ temperature sensors, $S_1$ through $S_n$, respectively, disposed on an integrated circuit (IC) chip to obtain n temperature measurement values, where n is a positive integer that is greater than or equal to two;
    in a processor disposed on the IC chip:
    receiving the n temperature sensor values and processing the received n temperature sensor values to generate PUF vector bits.

12. The method of clause 11, wherein the n received temperature measurement values are processed by:
    comparing a plurality of the n received temperature measurements values to one another to obtain a plurality of temperature difference values; and
    translating each temperature difference value into one or more PUF vector bits.

13. The method of clause 12, wherein said comparing is performed by comparing at least a first temperature measurement value obtained by the first temperature sensor, $S_1$, to the temperature measurement values obtained by second through $n^{th}$ temperature sensors, $S_2$-$S_n$, respectively, to obtain n temperature measurement values.

14. The method of any of clauses 12-13, wherein said comparing is performed by comparing all of the temperature measurement values to one another in pairs to obtain a temperature difference value for each pair of compared temperature measurement values.

15. The method of any of clauses 12-14, wherein said comparing is performed by:
    (a) setting a variable N=1 and a variable M=N+1;
    (b) taking a difference between two of the temperature sensors, $S_N$ and $S_M$, to obtain a temperature difference value;
    (c) discretizing the temperature difference value obtained at step (b) to produce one or more PUF vector bits;
    (d) incrementing M by one;
    (e) determining whether or not M is greater than n, wherein if it is determined that M is not greater than n, reiterating steps (b) through (e), wherein if it is determined that M is greater than n, incrementing N by one and setting M equal to N+1; and
    (f) determining whether or not N is greater than n, wherein if it is determined that N is not greater than n, reiterating steps (a) through (f) until it is determined at step (f) that N is greater than n.

16. The method of any of clauses 11-15, wherein the temperature measurement values are obtained by the temperature sensors and received and processed by the processor when the IC chip is in a quiescent state.

17. The method of any of clauses 11-15, wherein the temperature measurement values are obtained by the temperature sensors and received and processed by the processor when the IC chip is in an active load state.

18. A non-transitory computer-readable medium comprising computer instructions for execution by a processor to generate Physically Unclonable Function (PUF) vector bits, the computer instructions comprising:
a first set of computer instructions for receiving n temperature measurement values obtained by first through $n^{th}$ temperature sensors, $S_1$ through $S_n$, respectively, disposed on an integrated circuit (IC) chip, where n is a positive integer that is greater than or equal to two; and
a second set of instructions for processing the n received temperature measurement values to generate PUF vector bits.

19. The computer-readable medium of clause 18, wherein the second set of computer instructions comprise:
a third set of computer instructions that compare a plurality of the n received temperature measurements values to one another to obtain a plurality of temperature difference values; and
a fourth set of computer instructions that translate each temperature difference value into one or more PUF vector bits.

20. The computer-readable medium of clause 19, wherein the third set of computer instructions compare at least a first temperature measurement value obtained by the first temperature sensor, $S_1$, to the temperature measurement values obtained by second through $n^{th}$ temperature sensors, $S_2$-$S_n$, respectively, to obtain n temperature measurement values.

21. The computer-readable medium of any of clauses 19-20, wherein the third set of computer instructions compare all of the temperature measurement values to one another in pairs to obtain a temperature difference value for each pair of compared temperature measurement values.

22. The computer-readable medium of any of clauses 19-20, wherein the third set of computer instructions compare the plurality of the n received temperature measurements values to one another by:
(a) setting a variable N=1 and a variable M=N+1;
(b) taking a difference between the temperature sensor values of two of the temperature sensors, $S_N$ and $S_M$, to obtain a temperature difference value;
(c) discretizing the temperature difference value obtained at step (b) to produce one or more PUF vector bits;
(d) incrementing M by one;
(e) determining whether or not M is greater than n, wherein if it is determined that M is not greater than n, reiterating steps (b) through (e), wherein if it is determined that M is greater than n, incrementing N by one and setting M equal to N+1; and
(f) determining whether or not N is greater than n, wherein if it is determined that N is not greater than n, reiterating steps (a) through (f) until it is determined at step (f) that N is greater than n.

23. The computer-readable medium of any of clauses 19-22, wherein the computer instructions further comprise:
computer instructions that:
receive the PUF vector bits, security state signals and context as inputs; and
perform a key derivation function that processes the PUF vector bits, the security state signals and the context to generate a security key; and
stores the security key in a memory device.

24. The computer-readable medium of any of clauses 18-23, wherein the temperature measurement values are obtained by the temperature sensors and received and processed by the processor when the IC chip is in a quiescent state.

25. The computer-readable medium of any of clauses 18-23, wherein the temperature measurement values are obtained by the temperature sensors and received and processed by the processor when the IC chip is in an active load state.

26. A system for generating Physically Unclonable Function (PUF) vector bits, the system comprising:
means disposed on the IC chip for receiving n temperature measurement values obtained by first through $n^{th}$ temperature sensors, $S_1$ through $S_n$, respectively, disposed on the IC chip, where n is a positive integer that is greater than or equal to two; and
means disposed on the IC chip for processing the n received temperature measurement values to generate PUF vector bits.

27. The system of clause 26, wherein the means disposed on the IC chip for processing comprises:
means for comparing a plurality of the n received temperature measurements values to one another to obtain a plurality of temperature difference values; and
means for translating each temperature difference value into one or more PUF vector bits.

28. The system of clause 27, wherein said means for comparing compares at least a first temperature measurement value obtained by the first temperature sensor, $S_1$, to the temperature measurement values obtained by second through $n^{th}$ temperature sensors, $S_2$-$S_n$, respectively, to obtain n temperature measurement values.

29. The system of any of clauses 27-28, wherein said means for comparing compares all of the temperature measurement values to one another in pairs to obtain a temperature difference value for each pair of compared temperature measurement values.

30. The system of any of clauses 26-29, wherein said means for processing comprises:
means for receiving the PUF vector bits, security state signals and context as inputs;
means for processing the PUF vector bits, the security state signals and the context to generate a security key; and
means for storing the security key in a means for storing information disposed on the IC chip.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. A system for generating Physically Unclonable Function (PUF) vector bits, the system comprising:
a plurality of temperature sensors, first through nth temperature sensors, S1 through Sn, where n is a positive integer that is greater than or equal to two; and
a processor disposed on an integrated circuit (IC) chip, the processor being configured to receive a plurality of temperature measurement values from the plurality of temperature sensors, wherein said plurality of temperature measurement values are received from the plurality of temperature sensors and processed by the processor when the IC chip is in a quiescent state, and wherein the processor is further configured to process the received temperature measurement values to generate PUF vector bits.

2. The system of claim 1, wherein the plurality of temperature measurement values are processed by:
   comparing a plurality of the received temperature measurements values to one another to obtain a plurality of temperature difference values; and
   translating each temperature difference value into one or more PUF vector bits.

3. The system of claim 2, wherein said comparing is performed by comparing at least a first temperature measurement value obtained by the first temperature sensor, S1, to the temperature measurement values obtained by second through nth temperature sensors, S2-Sn, respectively, to obtain n temperature measurement values, where n is a positive integer that is equal to a total number of temperature sensors comprising said plurality of temperature sensors.

4. The system of claim 2, wherein said comparing is performed by comparing all of the temperature measurement values to one another in pairs to obtain a temperature difference value for each pair of compared temperature measurement values.

5. The system of claim 2, wherein said comparing is performed by:
   (a) setting a variable N=1 and a variable M=N+1;
   (b) taking a difference between two of the temperature sensors, SN and SM, to obtain a temperature difference value;
   (c) discretizing the temperature difference value obtained at step (b) to produce one or more PUF vector bits;
   (d) incrementing M by one;
   (e) determining whether or not M is greater than n, where n is a positive integer that is equal to a total number of temperature sensors comprising said plurality of temperature sensors, wherein if it is determined that M is not greater than n, reiterating steps (b) through (e), wherein if it is determined that M is greater than n, incrementing N by one and setting M equal to N+1; and
   (f) determining whether or not N is greater than n, wherein if it is determined that N is not greater than n, reiterating steps (a) through (f) until it is determined at step (f) that N is greater than n.

6. The system of claim 1, wherein the processor is further configured to receive the PUF vector bits, security state signals and context as inputs, the processor being further configured to process the PUF vector bits, the security state signals and the context to generate a security key, the processor being further configured to store the security key in the memory device.

7. The system of claim 1, wherein the system comprises a portable computing device (PCD) in which the IC chip is employed, and wherein the IC chip is a system-on-a-chip (SoC) IC chip.

8. The system of claim 7, wherein the PCD comprises a mobile phone.

9. The system of claim 1, wherein said plurality of temperature measurement values are received from the plurality of temperature sensors and processed by the processor when the IC chip is in an active load state.

10. A method for generating Physically Unclonable Function (PUF) vector bits, the method comprising:
   using first through nth temperature sensors, S1 through Sn, respectively, disposed on an integrated circuit (IC) chip to obtain n temperature measurement values, where n is a positive integer that is greater than or equal to two;
   in a processor disposed on the IC chip:
      receiving the n temperature sensor values and processing the received n temperature sensor values to generate PUF vector bits, wherein the temperature measurement values are obtained by the temperature sensors and received and processed by the processor when the IC chip is in a quiescent state.

11. The method of claim 10, wherein the n received temperature measurement values are processed by:
   comparing a plurality of the n received temperature measurements values to one another to obtain a plurality of temperature difference values; and
   translating each temperature difference value into one or more PUF vector bits.

12. The method of claim 11, wherein said comparing is performed by comparing at least a first temperature measurement value obtained by the first temperature sensor, S1, to the temperature measurement values obtained by second through nth temperature sensors, S2-Sn, respectively, to obtain n temperature measurement values.

13. The method of claim 11, wherein said comparing is performed by comparing all of the temperature measurement values to one another in pairs to obtain a temperature difference value for each pair of compared temperature measurement values.

14. The method of claim 11, wherein said comparing is performed by:
   (a) setting a variable N=1 and a variable M=N+1;
   (b) taking a difference between two of the temperature sensors, SN and SM, to obtain a temperature difference value;
   (c) discretizing the temperature difference value obtained at step (b) to produce one or more PUF vector bits;
   (d) incrementing M by one;
   (e) determining whether or not M is greater than n, wherein if it is determined that M is not greater than n, reiterating steps (b) through (e), wherein if it is determined that M is greater than n, incrementing N by one and setting M equal to N+1; and
   (f) determining whether or not N is greater than n, wherein if it is determined that N is not greater than n, reiterating steps (a) through (f) until it is determined at step (f) that N is greater than n.

15. The method of claim 10, wherein the temperature measurement values are obtained by the temperature sensors and received and processed by the processor when the IC chip is in an active load state.

16. A non-transitory computer-readable medium comprising computer instructions for execution by a processor to generate Physically Unclonable Function (PUF) vector bits, the computer instructions comprising:
   a first set of computer instructions for receiving n temperature measurement values obtained by first through nth temperature sensors, S1 through Sn, respectively, disposed on an integrated circuit (IC) chip, where n is a positive integer that is greater than or equal to two; and
   a second set of instructions for processing the n received temperature measurement values to generate PUF vector bits, wherein the temperature measurement values are obtained by the temperature sensors and received and processed by the processor when the IC chip is in a quiescent state.

17. The non-transitory computer-readable medium of claim 16, wherein the second set of computer instructions comprise:
   a third set of computer instructions that compare a plurality of the n received temperature measurements values to one another to obtain a plurality of temperature difference values; and
   a fourth set of computer instructions that translate each temperature difference value into one or more PUF vector bits.

18. The non-transitory computer-readable medium of claim 17, wherein the third set of computer instructions compare at least a first temperature measurement value obtained by the first temperature sensor, S1, to the temperature measurement values obtained by second through nth temperature sensors, S2-Sn, respectively, to obtain n temperature measurement values.

19. The non-transitory computer-readable medium of claim 17, wherein the third set of computer instructions compare all of the temperature measurement values to one another in pairs to obtain a temperature difference value for each pair of compared temperature measurement values.

20. The non-transitory computer-readable medium of claim 17, wherein the third set of computer instructions compare the plurality of the n received temperature measurements values to one another by:
   (a) setting a variable N=1 and a variable M=N+1;
   (b) taking a difference between the temperature sensor values of two of the temperature sensors, SN and SM, to obtain a temperature difference value;
   (c) discretizing the temperature difference value obtained at step (b) to produce one or more PUF vector bits;
   (d) incrementing M by one;
   (e) determining whether or not M is greater than n, wherein if it is determined that M is not greater than n, reiterating steps (b) through (e), wherein if it is determined that M is greater than n, incrementing N by one and setting M equal to N+1; and
   (f) determining whether or not N is greater than n, wherein if it is determined that N is not greater than n, reiterating steps (a) through (f) until it is determined at step (f) that N is greater than n.

21. The non-transitory computer-readable medium of claim 17, wherein the computer instructions further comprise:
   a fifth set of computer instructions that:
      receives the PUF vector bits, security state signals and context as inputs; and
      performs a key derivation function that processes the PUF vector bits, the security state signals and the context to generate a security key; and
      stores the security key in a memory device.

22. The non-transitory computer-readable medium of claim 16, wherein the temperature measurement values are obtained by the temperature sensors and received and processed by the processor when the IC chip is in an active load state.

23. A system for generating Physically Unclonable Function (PUF) vector bits, the system comprising:
   means for receiving n temperature measurement values obtained by first through nth temperature sensors, S1 through Sn, respectively, disposed on an IC chip, where n is a positive integer that is greater than or equal to two; and
   means for processing the n received temperature measurement values to generate PUF vector bits, wherein the temperature measurement values are obtained by the temperature sensors and received and processed when the IC chip is in a quiescent state.

24. The system of claim 23, wherein the means disposed on the IC chip for processing comprises:
   means for comparing a plurality of the n received temperature measurements values to one another to obtain a plurality of temperature difference values; and
   means for translating each temperature difference value into one or more PUF vector bits.

25. The system of claim 24, wherein said means for comparing compares at least a first temperature measurement value obtained by the first temperature sensor, S1, to the temperature measurement values obtained by second through nth temperature sensors, S2-Sn, respectively, to obtain n temperature measurement values.

26. The system of claim 24, wherein said means for comparing compares all of the temperature measurement values to one another in pairs to obtain a temperature difference value for each pair of compared temperature measurement values.

27. The system of claim 23, wherein said means for processing comprises:
   means for receiving the PUF vector bits, security state signals and context as inputs;
   means for processing the PUF vector bits, the security state signals and the context to generate a security key; and
   means for storing the security key in a means for storing information disposed on the IC chip.

* * * * *